Jan. 11, 1927.  1,613,904
O. C. RITZ-WOLLER
FLUID PRESSURE OPERATED DEVICE
Filed Nov. 13, 1922   3 Sheets-Sheet 1
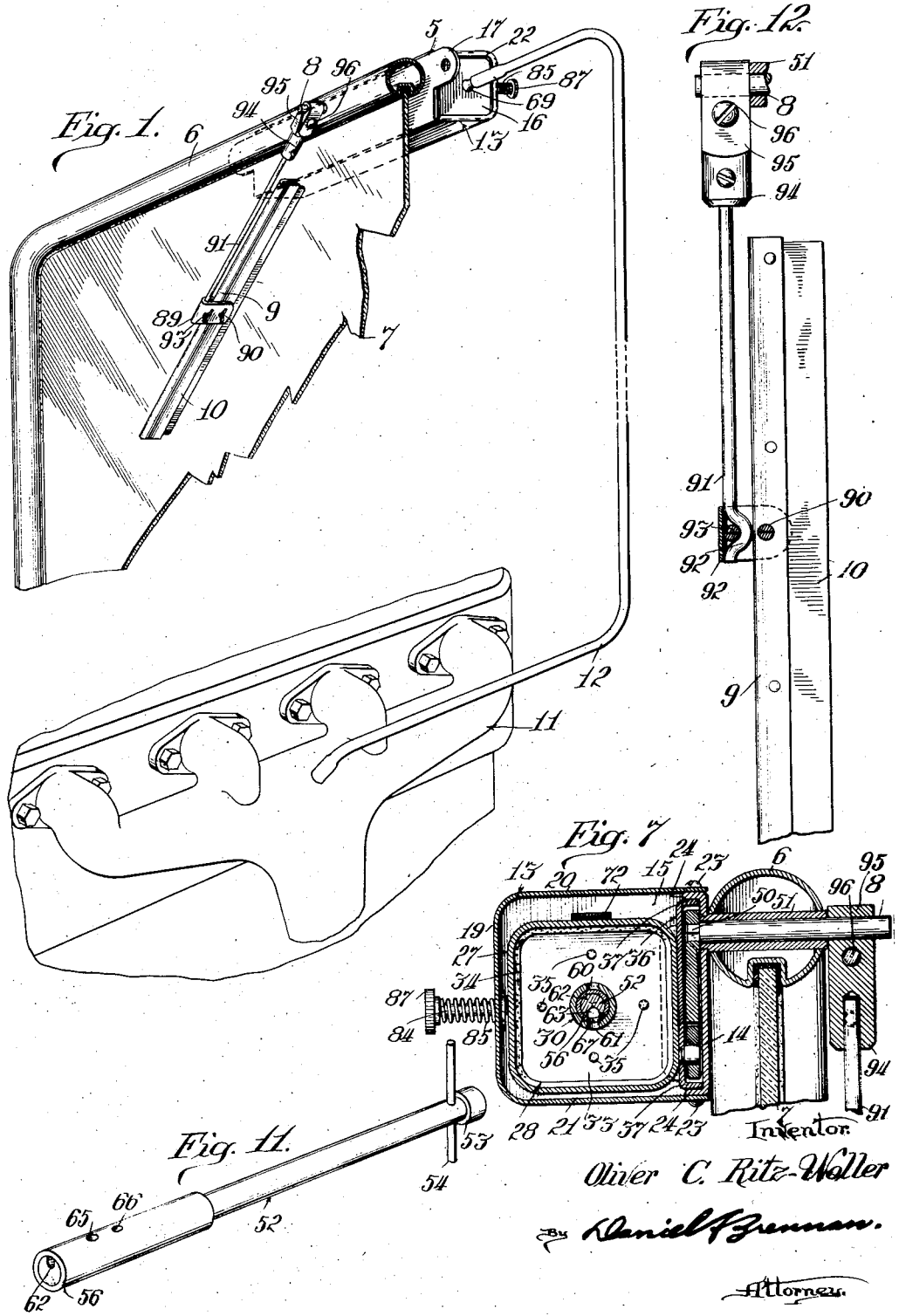

Jan. 11, 1927. 1,613,904
O. C. RITZ-WOLLER
FLUID PRESSURE OPERATED DEVICE
Filed Nov. 13, 1922    3 Sheets-Sheet 2
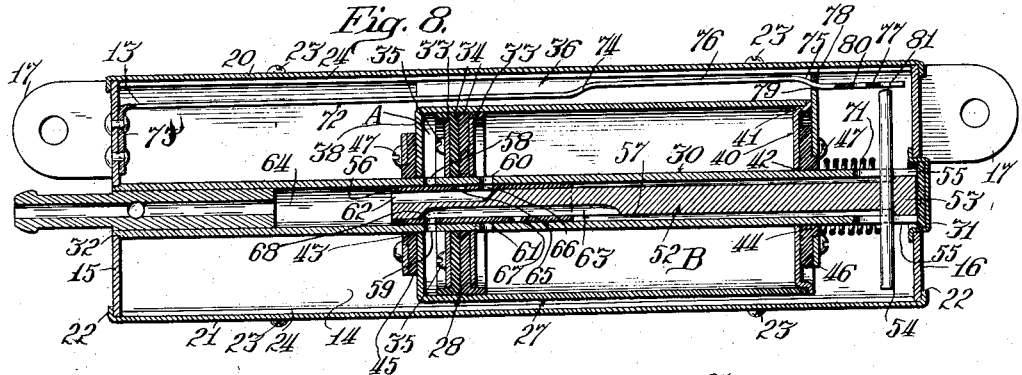
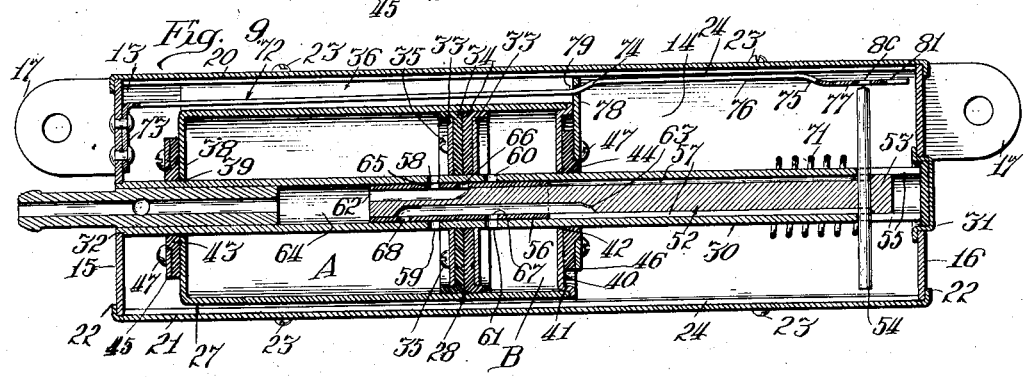
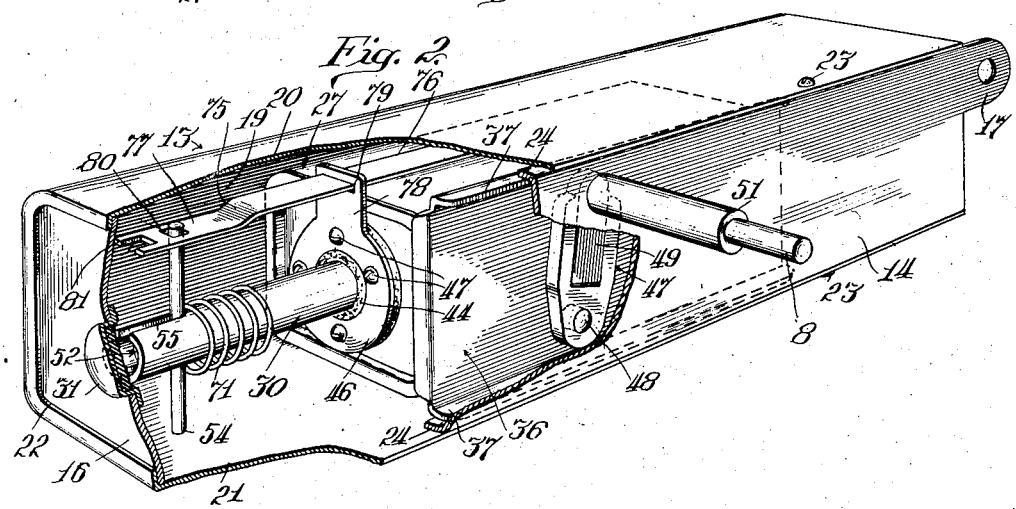
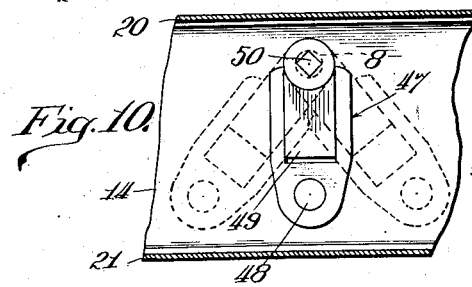
Inventor
Oliver C. Ritz-Woller
By Daniel Brennan
Attorney Jan. 11, 1927.
O. C. RITZ-WOLLER
1,613,904
FLUID PRESSURE OPERATED DEVICE
Filed Nov. 13, 1922    3 Sheets-Sheet 3
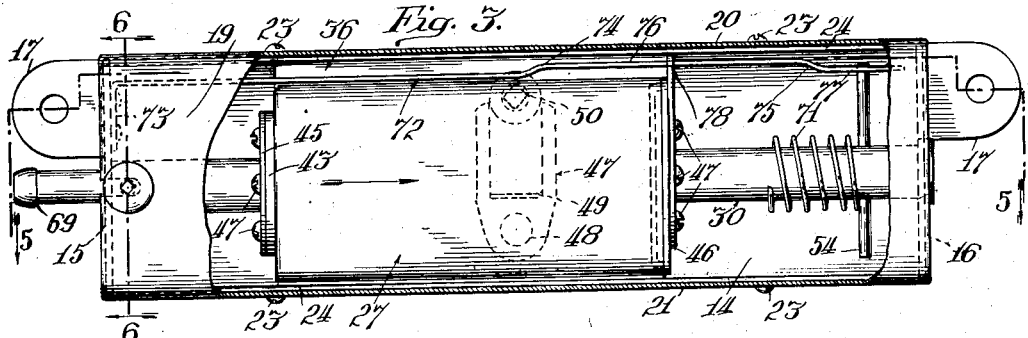
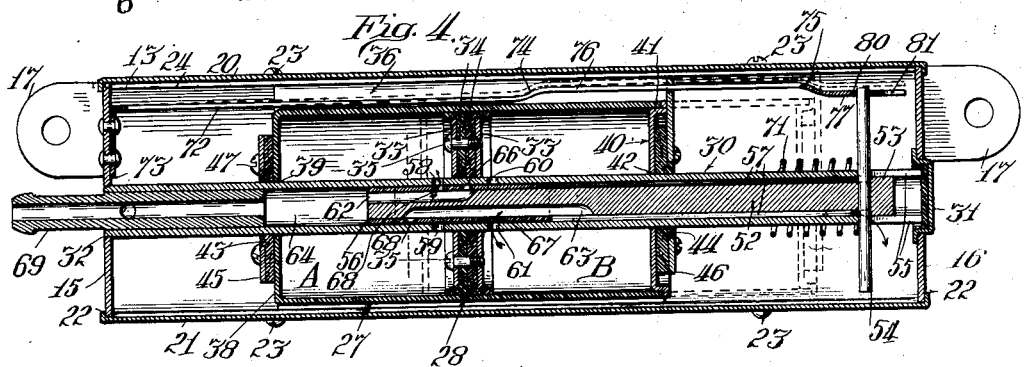
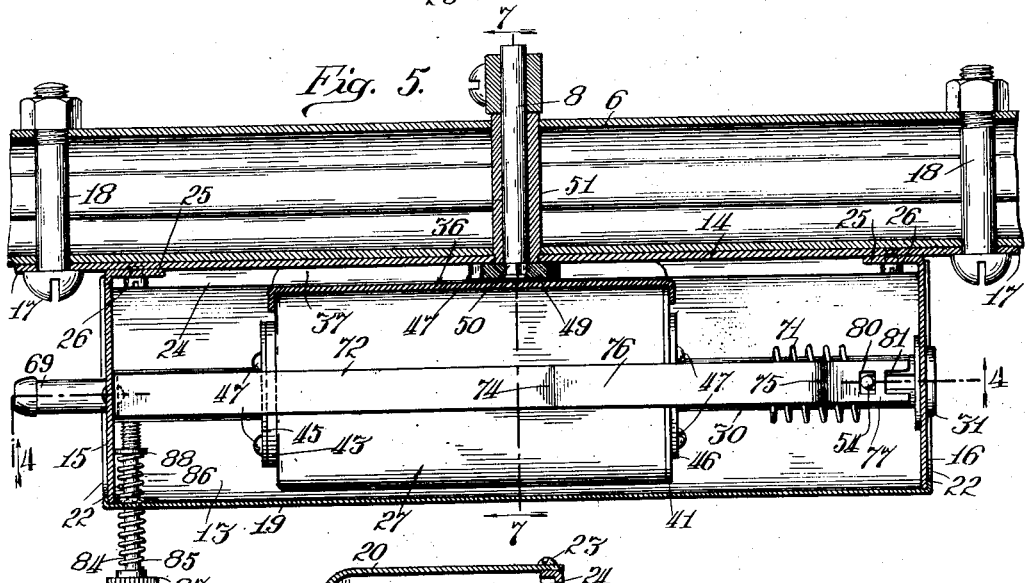
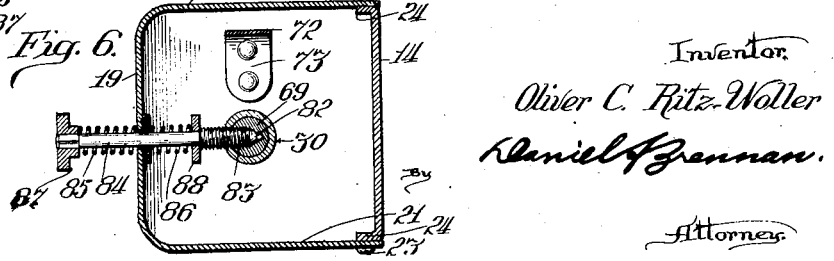
Inventor.
Oliver C. Ritz-Woller
Daniel A. Brennan
By
Attorney.

Patented Jan. 11, 1927.

1,613,904

UNITED STATES PATENT OFFICE.

OLIVER C. RITZ-WOLLER, OF CHICAGO, ILLINOIS.

FLUID-PRESSURE-OPERATED DEVICE.

Application filed November 13, 1922. Serial No. 600,785.

This invention relates to fluid pressure operated devices; more particularly to such devices operated by fluid under sub-normal pressure or suction, and more especially this invention includes improvements in fluid operated motors of the reciprocating type.

While this invention is illustrated as employed for the purpose of operating a cleaner for the wind shield of a motor vehicle, and in this arrangement relies upon the suction or sub-normal pressure in the intake manifold of an internal combustion engine for its pressure medium, it will be readily understood that such showing is merely exemplary of one of the uses of the device, and that it finds a wide field of utility for other purposes.

The principle objects and advantages which characterize this invention reside in the provision of improved means for transmitting motion; the provision of improved fluid pressure operated means for transmitting motion; the provision of an improved fluid pressure operated motor; the provision of improved apparatus operated by suction or sub-normal pressure for transmitting motion; the provision of an improved suction or sub-normal pressure operated motor; the provision of an improved fluid pressure operated reciprocating motor, especially adapted for operation by fluid under sub-normal pressure; the provision of an improved fluid pressure operated motor characterized by the embodiment which includes a reciprocating cylinder and stationary piston; the provision of an improved valve structure, the provision of an improved fluid pressure operated motor characterized by the embodiment therein of an improved valve and valve operating mechanism; the provision of an improved suction operated motor characterized by the provision of a moving cylinder and a stationary piston; the provision of a suction operated motor characterized by the provision therein of a movable cylinder and an improved valve and valve operating mechanism assembled to provide a unit structure; and the provision of a device of the character described and possessing the foregoing features which is simple and compact, rugged in construction, and capable of facile and effectual installation for adaptation to various purposes.

It is a further object of this invention to provide an improved fluid pressure operated motor which as a unit may be readily installed on the top bar of the frame of a transparent wind shield without material alteration in the wind shield structure, and wherein the motor occupies but a small space, and does not in any way hinder the view through the wind shield.

The foregoing and such other objects and advantages as may appear or be pointed out as this description proceeds are attained in the structural embodiment herewith illustrated, in which:

Figure 1 is a perspective view, partly schematic and in section, of this invention installed;

Figure 2 is an enlarged perspective view, partly broken away, of this improved fluid pressure operated motor;

Figure 3 is a fragmentary elevational view;

Figure 4 is a longitudinal vertical sectional view taken on line 4—4 of Figure 5, looking in the direction indicated by the arrows;

Figure 5 is a longitudinal horizontal sectional view taken on line 5—5 of Figure 3, looking in the direction indicated by the arrows;

Figure 6 is a transverse vertical sectional view taken on line 6—6 of Figure 3, looking in the direction indicated by the arrows;

Figure 7 is a transverse vertical sectional view taken on line 7—7 of Figure 5, looking in the direction indicated by the arrows;

Figures 8 and 9 are longitudinal sectional views similar to Figure 4, illustrating various operating positions of this device;

Figure 10 is a detail sectional view;

Figure 11 is a perspective view of a detail part; and

Figure 12 is an enlarged elevational view of a squeegee for use in this device.

Referring now more particularly to the drawings, and first to Figure 1, there is provided the improved fluid pressure motor of this invention, here generally designated 5, and said motor is mounted fixedly on the rear face of the upper bar 6 of the frame of a transparent wind shield 7, such as are commonly employed on automobiles. A shaft 8, hereinafter more fully described, extends through the bar 6, and carries on its projecting end a squeegee 9, which has its blade 10 presented toward and in contact with the glass 7.

The intake manifold 11 of any standard internal combustion engine is connected with the motor 5 by a flexible conduit 12, a subnormal pressure being generated in said conduit, as will be readily understood.

The motor of this invention, illustrated more or less completely in Figures 2 and 11, inclusive, includes a housing 13 which contains the motor and its associated mechanism. The housing or casing 13 comprises a back wall 14 extended beyond the end walls 15 and 16 to afford apertured ears 17—17, through which ears and the bar 6 the bolts 18—18 pass, for securing the casing 13 to the wind shield. The front and side walls of the casing are made of a single sheet of metal bent to form the portions 19, 20, and 21, said walls having their end margins flanged at 22—22 for engagement with the outer faces of the end walls 15 and 16. The walls 20 and 21, at their rear margins are affixed, by screws 23, or the like, to forwardly bent flanges 24—24, formed on the rear wall 14; and the end walls 15 and 16 are each provided with a base flange 25, through which screws 26, or the like are passed into the wall 14.

The motor comprises a cylinder 27 and a piston 28, and for the purposes of this invention it is preferred that the cylinder form the moving part of the combination.

As shown best in Figures 4, 8 and 9, the piston 28 is fixedly mounted on a tubular support 30, which functions as a valve casing, piston rod, guide and conduit, as will appear. The tubular support 30 is, at one end, seated in a socket member 31, engaged in the end wall 16, and said support is, at the opposite end, suitably fixedly secured in an opening in the wall 15, as indicated at 32.

The piston preferably comprises two metal disks 33—33, fixedly secured to the support 30 at a point medial of the length of travel of the cylinder, between which disks there are positioned two packing disks 34, screws 35 passing through the disks 33 and 34 for holding same together. Obviously, any other suitable piston construction may be provided.

The cylinder, as here shown, is substantially rectangular and is provided with a base 36, forming a cross-head, said base having flanges 37—37, receivable between the flanges 24—24, and guided thereby, as best seen in Figure 7, said flanges 37 also serving to space the base 36 from the wall 14 for a purpose presently to appear.

The cylinder has one integral end wall 38 provided with an axial opening 39, through which the tubular support 30 passes, the other end wall 40 of the cylinder being removable and flanged at 41 for securement in the cylinder end to form a cylinder head. The head 40 is provided with an opening 42 through which the support 30 also passes. Leakage at the openings 39 and 42 is prevented by the provision of packing glands 43 and 44, which may be made of any suitable packing material. Plates 45 and 46, and the screws 47, serve to hold the packing glands 43 and 44 in position.

The cylinder is operatively connected to the shaft 8, as best shown in Figures 7 and 10, by the provision of a bifurcated element or fork 47, pivotally mounted upon a pin 48 in the cross-head 36, and a lever 49 slidably engaged with said fork and fixedly connected to the reduced squared end 50 of the shaft 8. A bearing sleeve 51 surrounds the shaft 8 and said sleeve extends through the bar 6 for supporting said shaft.

The valve and valve operating mechanism comprises a sliding valve member, a latch for holding the valve in one position, and means on the cylinder for releasing said latch.

The valve comprises a stem portion 52 arranged in the tube or conduit 30, said stem having its outer end enlarged at 53 for snugly fitting the tube 30, a transverse pin 54 being fixedly secured to said stem, the opposite ends of the stem projecting through complemental slots 55 diametrically oppositely arranged in the tube 30, for a purpose which will presently appear.

The inner end of the valve stem carries the sleeve 56, fixedly secured to said stem, and having a sliding but snug fit in the support 30. The stem 52 being smaller than the internal diameter of the tube 30 affords a passageway 57 for air.

The support 30 is provided with ports 58, 59, 60 and 61, arranged in pairs on both sides of the piston 28 and the units of each pair being diametrically oppositely disposed in said tube, for a purpose which will presently appear.

The stem 52 is provided with a channel 62, extending from the inner end to a predetermined point under the sleeve 56, and similarly, a second channel 63 is provided in the stem, beneath the sleeve 56, and of predetermined length. The inner end of the channel 62 communicates with the chamber 64, and said channel is also in communication with the ports 65 and 66 in the sleeve 56, said ports being arranged relatively close together, the port 66 being at the termination of the channel 62.

The outer end of the channel 63 is in communication with the passageway 57, and at the medial portion and inner end of said channel 63 ports 67 and 68, respectively, are provided.

Suction is imposed upon or created in the chamber 64 by provision of a coupling pipe 69, which latter is connected to the flexible conduit 12, hereinbefore referred to, or to any other suitable means for producing sub-normal pressure.

For moving the valve stem in one direction, a helical expansion spring 71 surrounds the support 30 between the pin 54 and the cylinder head, said spring 71 coming in contact with said head when the cylinder moves to the right, as seen in Figure 8. Thus, the spring 71 serves to move the valve to the right for admitting fluid under pressure to one end of the cylinder. As will later appear, the valve stem is moved to the left in response to suction in the chamber 64.

The latch previously referred to preferably comprises a resilient strip 72, fixedly secured at 73 to the end wall 15 of the casing 13, said strip extending longitudinally of the casing and toward the wall 16 in proximity to the cylinder. The resilient strip 72 is provided with inclined portions 74 and 75 affording an offset portion 76, the end 77 of said strip being free to move toward and away from the longitudinal axis of the device. The plate 46 is provided with a radial extension 78 apertured at 79 to receive said resilient strip 72.

The portion 77 of said resilient strip is provided with an opening 80, and the free end of said strip has a notch 81 therein, said opening and notch serving alternately to receive the adjacent end of the pin 54.

In order to control sub-normal or other pressure in the chamber 64, and if necessary to shut off such pressure, a needle valve 82 is threaded into the pipe 69 as indicated at 83, (Figure 6), said valve being operable from without the housing 13 by the provision of a yieldingly resistantly mounted rod 84 surrounded by helical springs 85 and 86, one of which springs abuts the knob 87, and the wall 19, and the other of which springs abuts the wall 19 and a disk 88 on said rod 84. Movement of the needle valve will admit or exclude pressure to or from the chamber 64.

A squeegee, such as that shown in Figures 1 and 12, is mounted upon the free extending end of the shaft 8, said squeegee preferably comprising with the rubber or other flexible blade 10, the frame 9 bent reflexively to grip said blade, a bracket 89 secured to the frame by a cotter pin 90, and an arm 91 having a hook 92 engaging beneath a pin 93 carried by the bracket 89. The arm 91 is secured in the enlarged part 94 of a divided clamp 95, which latter engages the shaft 8, and is secured thereto by a set screw 96.

In operation, assuming sub-normal pressure or suction to exist in the chamber 64, and the parts to be in the position shown in Figure 4, a reduction in pressure will take place in the working chamber A of the cylinder 27, by virtue of communication of such pressure through the channel 62 and ports 65 and 58, the valve being in the extreme left hand position as viewed in Figure 4. As the other working chamber of the cylinder, designated B, is in free communication with atmospheric pressure via the ports 61, 67 and channel 63 and passageway 57, the cylinder responds by moving to the right.

As the cylinder approaches the end of its travel to the right of the plate 46 on the cylinder head 40 compresses the spring 71 against the pin 54, but said pin is held (and the valve stem also) against movement by the engagement of said pin with the opening 80. However, at the position shown in dotted lines in Figure 4, the radial extension 78 engages the inclined part 75 and disengages the end portion 77 from the pin 54, and in response to the pressure of the spring 71, said pin, and the valve, recede toward the wall 16, thus moving the valve to the position shown in Figure 8.

This motion of the valve opens the working chamber A to atmosphere via ports 59, 68, channel 63 and channel 57, and connects chamber 64 with the working chamber B via ports 60, 66 and channel 62, whereupon the cylinder retraces its movement. Now, while the spring 71 is under compression at this moment and tends to move the valve, it is held from so doing by virtue of the extension 78 leaving the inclined part 75 and permitting the notch 81 to engage the pin 54 and restrain the valve against movement. It is to be observed that the spring 71, being under compression, prevents any material movement of the valve stem, so that the latter is held first by the spring 71, and as the cylinder releases the latch, then becomes positively held by said latch.

When the cylinder reaches the extreme left hand end of its travel (Figure 9) the extension 78 engages inclined part 74, raises the strip 72, and again releases the pin 54, whereupon the valve, in response to the action of suction in the chamber 64, returns to the position seen in Figures 4 and 9. The cylinder then, of course, returns, and the reciprocation thus, of said cylinder, continues indefinitely as long as subnormal pressure maintains in the chamber 64.

The reciprocatory motion of the cylinder is transmitted to the squeegee by virtue of the connecting elements shown in Figures 2 and 10, and thereby the squeegee is caused to oscillate across the transparent part of the wind-shield. Thus, a reciprocatory motion is translated to an oscillatory motion desirable for cleaning, the control of the device being at all times at the will of the operator.

While certain details of construction have been emphasized herein, it will be understood that minor alterations in the details may be made within the spirit of this invention, and the scope of the claims.

Having thus described my invention and its use, what I claim as new and desire to secure by Letters Patent is:

1. In a device of the character described, in combination, a movable cylinder, a stationary piston in said cylinder, a valve for controlling admission of fluid under pressure to said cylinder, a latch for holding said valve in one position, and means on said cylinder for releasing said latch.

2. In a device of the character described, in combination, a movable cylinder, a stationary piston in said cylinder, a valve for controlling admission of fluid under pressure to said cylinder, a latch for holding said valve in one position, yieldingly resistant means for moving the valve to another position, and means on said cylinder for releasing said latch.

3. In a device of the character described, in combination, a movable cylinder, a stationary piston in said cylinder, a support for said cylinder, and piston including a conduit, a valve in said conduit, and means on said cylinder for actuating said valve.

4. In a device of the character described, in combination, a movable cylinder, a stationary piston in said cylinder, a support for said cylinder, and piston, including a conduit, a valve in said conduit, a latch for holding said valve in one position, and means on said cylinder for releasing said latch.

5. In a device of the character described, in combination, a movable cylinder, a stationary piston in said cylinder, a support for said cylinder, and piston including a conduit, a valve in said conduit, a latch for holding said valve in one position, yielding means for moving said valve to another position, and said latch being releasable by the movement of said cylinder.

6. In a device of the character described, in combination, a movable cylinder, a stationary piston in said cylinder, a support for said cylinder and piston including a conduit, a valve in said conduit, a latch for holding said valve in one position, yielding means for moving said valve to another position, and means on said cylinder for releasing said latch when the cylinder is moved in one direction.

7. In a fluid pressure operated apparatus, in combination, a moving cylinder and a stationary piston, means for controlling admission of fluid under pressure to said cylinder, said means being operable in one direction by such fluid, and movable in another direction by said cylinder.

8. In a device of the character described, a stationary piston in a cylinder, a valve for controlling admission of fluid under pressure to said cylinder, said valve being movable in one direction under the influence of said fluid under pressure, and yielding means operated by the cylinder for moving the valve in another direction.

9. In a device of the character described, in combination, a moving cylinder automatically displaceable in response to suction, a piston stationarily mounted with respect to said cylinder, a source of constant suction, a hollow piston rod having ports on opposite sides of said piston, and means in said piston rod for applying such suction to the cylinder alternately on either side of said piston through said ports for moving said cylinder.

10. In a fluid pressure operated apparatus, in combination, a piston and a cylinder movable thereon, means for controlling the admission of fluid under pressure to said cylinder, said means being movable in response to such fluid under pressure, a latch for said controlling means, and means actuated by the movement of said cylinder for releasing said latch.

11. In a device of the character described, in combination, a relatively fixed piston, a cylinder movable thereon, a resilient element to be moved by said cylinder, a hollow piston rod for supplying fluid to said cylinder, a valve in said piston rod and actuated by said element to be moved.

In testimony whereof, I affix my signature at 36 West Randolph St., Chicago, Illinois.

OLIVER C. RITZ-WOLLER.